United States Patent [19]

Zelahy et al.

[11] 4,144,433

[45] Mar. 13, 1979

[54] METHOD FOR METAL BONDING

[75] Inventors: John W. Zelahy, Cincinnati; Terry L. Jones, Middletown, both of Ohio

[73] Assignee: General Electric Company, Cincinnati, Ohio

[21] Appl. No.: 751,160

[22] Filed: Dec. 16, 1976

[51] Int. Cl.² .................. H05B 5/00; B23K 13/00
[52] U.S. Cl. .................. 219/9.5; 219/10.41; 219/10.53
[58] Field of Search .......... 219/9.5, 6.5, 7.5, 8.5, 219/10.41, 10.43, 10.53, 10.75, 85 R, 85 A, 85 E, 85 M

[56] References Cited

U.S. PATENT DOCUMENTS

| 2,625,637 | 1/1953 | Gaonev et al. | 219/9.5 |
| 4,012,616 | 3/1977 | Zelahy | 219/9.5 |

Primary Examiner—Bruce A. Reynolds
Attorney, Agent, or Firm—Lee H. Sachs; Derek P. Lawrence

[57] ABSTRACT

Metal components having an irregular cross-sectional configuration or made of different metals or alloys are bonded together through a forged joint resulting from application of localized high frequency induction heating combined with high energy rate impacting by pre-shaping interface portions to be joined as a function of the cross-sectional shapes of the components.

2 Claims, 5 Drawing Figures

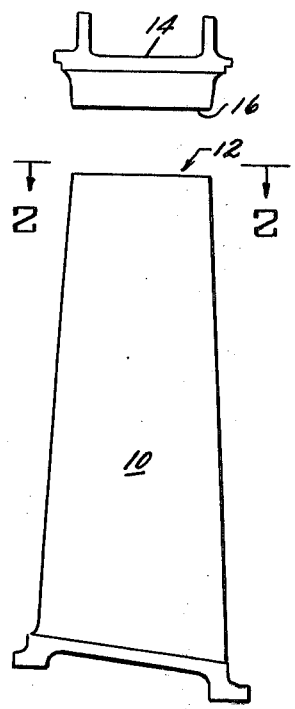
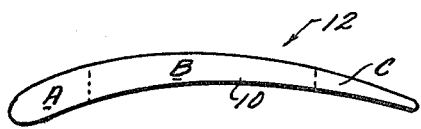
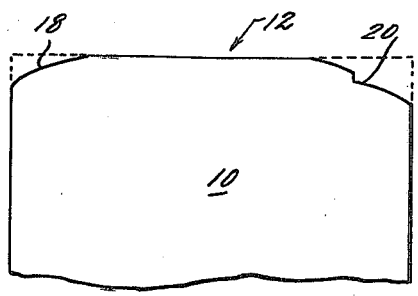
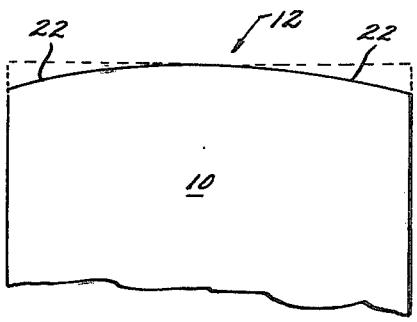
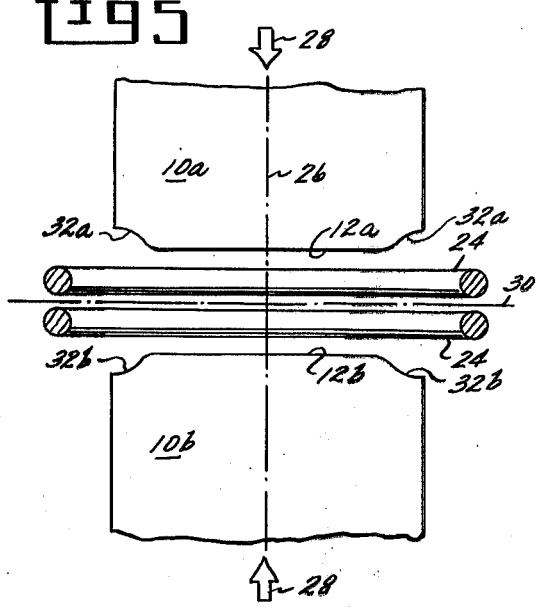

METHOD FOR METAL BONDING

The invention herein described was made in the course of or under a contract, or a subcontract thereunder, with the United States Department of the Air Force.

FIELD OF THE INVENTION

This invention relates to the metallurgical bonding of metal components and, more particularly, to the use of the combination of high frequency induction heating and high energy rate impacting to provide a forged joint.

CROSS REFERENCES

This application is related to copending application Ser. No. 538,158, filed Jan. 2, 1975 of John W. Zelahy, now U.S. Pat. No. 4,012,616, issued Mar. 15, 1977, assigned to the assignee hereof; and to its divisional application Ser. No. 718,079, filed Aug. 26, 1976.

BACKGROUND OF THE INVENTION

The pressure bonding process and apparatus described in the above-identified cross-referenced applications, the disclosures of which are incorporated herein by reference, apply high frequency induction heating to the cooperating interface portions of metal components to be joined from within the space between them prior to a high energy rate impacting operation. The high frequency induction heating, which is characterized by localized surface heating, is largely dependent upon the surface area to be heated and the distance between the high frequency induction heating coil and the surfaces to be heated. Thus, for a given power output and configuration of the heating coil, the larger the interface surface area, the slower the heat-up rate. Similarly, the closer the heating coil is to the surface, the faster and more shallow will be the heating. If the heat-up rates and cross-sectional shapes of the mating components are not taken into consideration in the application of the induction heat, irregular and undesirable bonding can occur.

In addition to such problem of relative heating, there is an additional problem when bonding a component of irregular cross section, especially one which includes segments of cross-sectional area significantly different from other segments of that interface portion. Typical examples include bonding of airfoils to their bases and the jointing of "T" shapes and "L" shapes where very large differences in cross-sectional area exist. In such cases, it is important that the thickness/upset ratio be held constant through the entire joint. If such ratio is not held constant, the thin areas will overheat or will over-upset, or both, causing them either to buckle or to telescope or shingle over the mating component.

SUMMARY OF THE INVENTION

It is a principal object of the present invention to provide an improved method for induction pressure bonding cooperating metal components, at least one of which includes a segment of cross-sectional area substantially different from another segment of that portion, to produce substantially even heating across such interface portion and a constant thickness/upset ratio.

This and other objects and advantages will be more clearly understood from the following detailed description, the drawing and the examples, all of which are intended to be representative of rather than in any way limiting on the scope of the present invention.

One form of the method associated with the present invention for the above-described pressure bonding of cooperating metal components at cooperating interface portions, a first of which has a first interface segment smaller in cross-sectional area than does a second interface segment of that first portion, includes initially pre-shaping the first interface portion so that the first or smaller segment is recessed from the second or larger segment of that first interface portion. Then the cooperating interface portions are positioned in spaced apart relationship along a pressure axis through the portions so that the first segment is farther from the plane of the intended joint than is the second segment, after which the method of pressure bonding is conducted using high frequency induction heating and high energy rate impacting.

BRIEF DESCRIPTION OF THE DRAWING

FIG. 1 is an exploded view of an airfoil and a shroud of a gas turbine engine vane;

FIG. 2 is a cross-sectional view along lines 2—2 of FIG. 1;

FIGS. 3 and 4 are fragmentary views of the vane airfoil; and

FIG. 5 is a fragmentary view of two airfoil shapes in position for heating with an induction heating coil.

DESCRIPTION OF THE PREFERRED EMBODIMENTS

As was pointed out in the above cross-referenced applications, significant cost reductions were achieved through the fabrication of individual components using the combination of high frequency induction heating, localized at cooperating portions, and high energy rate impacting with a force sufficient to upset each opposed portion and to expel metal from between them to produce a forged joint. When using such a pressure bonding method to join components, at least one interface portion of which includes a plurality of segments having cross-sectional areas substantially different from one another, for example as exists in a typical airfoil, uneven heating of the airfoil interface portion resulted in uneven, defective joints. Although some of the uneven heating can be compensated for through a particular shaping of the induction heating coils disposed within the gap between the components to be joined, it was recognized that more accurate control can be achieved by particularly shaping the interface portion having the nonuniform or irregular cross-sectional area segments.

During the evaluation of the present invention, the fabrication of blades and vanes for gas turbine engines was studied. A typical problem as presented above is involved in the joining of an airfoil shaped vane portion with a shroud portion represented in the exploded view of FIG. 1. Airfoil 10 includes an interface portion 12 through which it is joined to shroud 14 through shroud interface portion 16. As shown in the cross-sectional view of FIG. 2 taken along lines 2—2 of FIG. 1, interface portion 12 can be considered to include three segments A, B and C, each of which has a cross-sectional area or shape significantly different from that of the segment adjacent to it. For example, segment C representing the trailing edge of the vane significantly decreases in cross-sectional area away from segment B. Similarly, segment A, representing the leading edge of the vane, changes in cross-sectional area but somewhat differently than does segment C.

It can be appreciated that heating uniformly from within the gap between airfoil 10 and shroud 14 during the pressure bonding method, as described in the cross-referenced applications, could result in uneven heat penetration or uneven heating of the material of the various segments. For example, because segment C is the thinnest of the segments, it will heat up more rapidly than will the others. Similarly, segment A will heat more rapidly than will segment B. Thus, upon subsequent high energy rate impact forging, it was found that segment C would buckle or deform more readily than would the other segments. Although variable heating can be accomplished as a result of change in shape of the high frequency induction heating coils, as described in the above-identified cross-referenced application, it has been found, according to the present invention, that more accurate control can be achieved by particularly preshaping selected interface portions. One typical preshaping arrangement is shown in the fragmentary view of FIG. 3 wherein segment A has been preshaped at 18 and segment C has been preshaped at 20. The material removed in preshaping is shown in phantom. During the evaluation, it was found that the type of preshaping avoided uneven heating and therefore subsequent uneven upset during high impact forging. Also, it was useful in avoiding the telescoping or shingling problems which can result during such forging from the difference in cross-sectional areas between cooperating components being joined.

A more simplified preshaping of airfoil 10 is shown in FIG. 4 for a vane cross section in which the segments A and C blend substantially uniformly toward the center of segment B. In the preshaping arrangement of FIG. 4, interface portion 12 has been provided with a radius which peaks at about the center of the airfoil tip. For example, in one evaluation, such a radius resulted in material being removed to provide a maximum drop of about 0.04" through the removal of material at 22 in FIG. 4.

Many pressure bonded joints were made, according to the present invention, between components of a commercially available Ti-base alloy, sometimes referred to as Ti6-4 alloy and including, nominally by weight, 6% Al, 4% V with the balance Ti. Such components, each of which was airfoil shaped, are shown in the fragmentary view of FIG. 5 as 10a and 10b. FIG. 5 represents the type of arrangement and apparatus described in the above cross-referenced applications, for example in connection with their FIG. 8.

With reference to FIG. 5 of this application, a high frequency induction heating coil 24 is disposed initially in a gap between airfoil portions 10a and 10b which are aligned along a pressure axis 26. During practice of the referenced pressure bonding method, one or both of the airfoil portions are moved toward one another along axis 26 by a high energy rate force means, indicated diagrammatically by arrows 28. Such movement occurs after coil 24 has applied heat to airfoil interface portions 12a and 12b, and has retracted from the gap between them. The interface portions are impacted for bonding, such as at the plane of the intended joint, represented at 30 in FIG. 5. Prior to bonding, interface portions 12a and 12b have been preshaped as shown at 32a and 32b, respectively, according to the present invention.

In one evaluation, the Ti-6-4 alloy airfoil portions were bonded using a peak bonding temperature of about 1750°–1850° F. and a 50 KW, 450KH$_z$ power source. Heat-up rates were relatively slow (e.g., about 15–20 seconds) up to about 1500° F. to allow stabilization of heat across both opposed interface portions. Full power was then applied, rapidly raising the interface portions to the selected peak bonding temperature, in this example in the range of 1750°–1850° F. In this example using gas turbine engine vane airfoil shapes, the increase in temperature was virtually instantaneous. Bonding pressures ranged from 20,000 psi to 50,000 psi. Using the combination of preshaped interface portions and stepped heat-up rates, excellent joint quality was obtained.

Although the present invention has been described in connection with specific examples and typical embodiments, it will be recognized by those skilled in the art that variations and modifications can be made of the present invention without departing from its scope. It is intended to include in the appended claims all such variations and modifications.

What is claimed is:

1. In a method for pressure bonding a plurality of metal components at cooperating interface portions to produce a forged joint about a joint plane between the components, at least a first interface portion having a first interface segment smaller in cross-sectional area than a second segment of the first portion, the method including a first induction heating the cooperating portions to a bonding temperature less than their respective melting temperatures but at which metal upset can occur and then impacting the portions along a pressure axis substantially perpendicular to the joint plane at a high energy rate with a force sufficient to expel metal of each component from between the impacting portions to produce the forged joint, the improvement comprising:

preshaping at least the first interface portion so that the first segment is generally recessed from the second segment in an amount which increases with the differences in cross-sectional areas between the first and second segments;

positioning the cooperating interface portions in spaced apart relationship along the pressure axis so that the first segment is further from the joint plane than is the second segment; and then conducting the method of pressure bonding by high frequency induction heating from within the space between the cooperating interface portions and then high energy rate impacting the interface portions to produce the forged joint.

2. The method of claim 1 in which the first interface portion has an airfoil shaped cross section.

* * * * *